(No Model.)
E. S. HOYT.
PROCESS OF MANUFACTURING GAS.
No. 546,014. Patented Sept. 10, 1895.
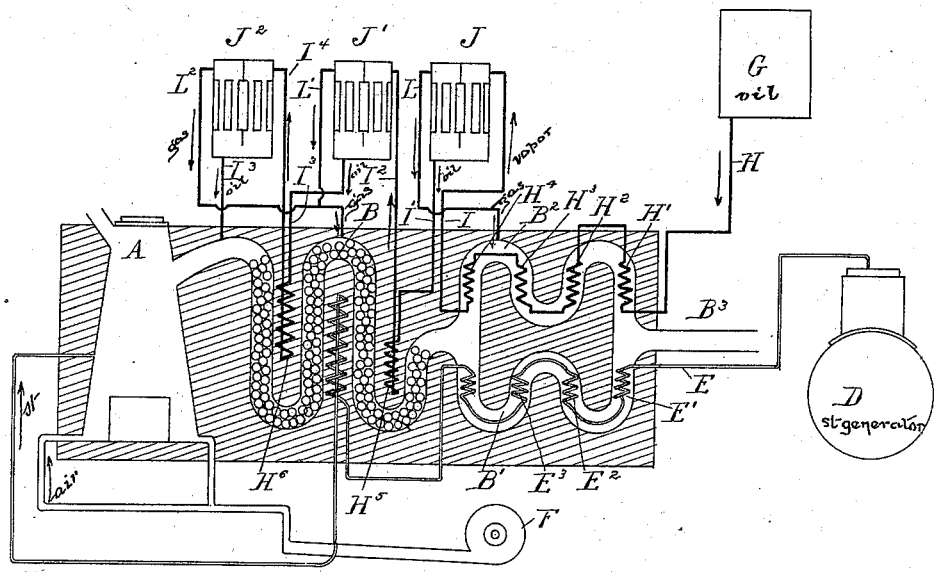
Witnesses
A. L. Noble
L. J. Whittemore
Inventor
Ezra S. Hoyt
By Wm. S. Sprague & Son
Attys.

UNITED STATES PATENT OFFICE.

EZRA S. HOYT, OF DETROIT, MICHIGAN, ASSIGNOR, BY DIRECT AND MESNE ASSIGNMENTS, TO THE HOYT-SPEER COMPOUND GAS COMPANY, LIMITED, OF SAME PLACE.

PROCESS OF MANUFACTURING GAS.

SPECIFICATION forming part of Letters Patent No. 546,014, dated September 10, 1895.

Application filed December 1, 1894. Serial No. 530,530. (No specimens.)

*To all whom it may concern:*

Be it known that I, EZRA S. HOYT, a citizen of the United States, residing at Detroit, in the county of Wayne and State of Michigan, have invented certain new and useful Improvements in Processes of Manufacturing Gas, of which the following is a specification, reference being had therein to the accompanying drawing.

This invention relates specifically to the manufacture of gas wherein hydrocarbon oil is used for enriching gaseous products obtained from other sources. In the present state of the art the hot products obtained by blasting carbonaceous fuel in a generator with air and steam are conducted through a so-called "regenerating-furnace" filled with refractory material and therein combined with the vapors of petroleum-oil in order to make a gas for commercial purposes. It has been found that by this method of combining the petroleum with the gas from the generator a portion of the vapors is either converted into lampblack in the regenerating-furnace or some portions pass off uncombined with the other products and subsequently condense when the gas is cooled and are thus lost.

My invention consists in the new method of combining the petroleum-oil or oil products therefrom with the products from the generator, whereby all waste of oil is avoided.

It consists, broadly, in heating a current of oil at gradually-increasing temperatures by means of the heated products from the generator and separating from the current the vapors generated at the temperatures at which the different constituents of the oil are separately converted into fixed vapors. In subjecting these vapors separately to cooling and then introducing the remaining fixed vapors into the regenerating-furnace and combining them with the hot products from the generator the residuum of the oil which has not been converted in this manner into fixed vapors is used in the usual manner by introducing it either directly into the furnace or into the regenerating-chamber and admitted therein to destructive distillation in contact with the hot products.

In carrying out my method in a practical manner I use a series of heaters, through which the oil flows from a suitable source of supply. These heaters are located either directly in the regenerating-chamber or in flues or openings formed in the brickwork which is exposed to the hot products, the arrangement being such that the flow of the oil is opposite to that of the flow of the gases, whereby the oil is in different heaters successively heated to the temperatures at which the constituents of the oil are separately converted into fixed vapors. When the oil is heated to such temperatures, the vapors generated are separately carried into suitable condensers, wherein the vapors which have not passed into fixed vapors are condensed and again carried back into the current of oil to be subjected to the heat in the next heater. The fixed vapors are thus obtained from condensable vapors and are preferably separately introduced into the regenerating-chamber and combined with the hot products at predetermined temperatures, according to the nature of the fixed vapor, approximately the same as that at which it became fixed, all as more fully hereinafter described, and shown in the drawing.

My invention is explained in connection with a diagram showing a vertical central section through the generating and regenerating chamber. The generator is, as usual, built of brickwork, and comprises a single generating-chamber A and the regenerating-chamber B, through which the hot products are carried off from near the top of the generator. The generator-chamber is provided with means for introducing air and steam, and has suitable appliances for introducing coal into the top of the chamber. The regenerating-chamber is partly filled with refractory material in the form of bricks or spheres and is divided in two branches B' B², which afterward reunite into a single discharge-passage B³, through which the gas is carried off through the usual appliances for scrubbing it.

D represents a steam-generator from which a current of steam is carried through the pipe E into the rear end of the generator and carried through a series of superheaters E' E²

$E^3$, &c., which are suitably exposed to the heat of the hot gases and from which the superheated steam is finally introduced into the charge in the generator, and F represents the apparatus for creating an air-blast for blasting the charge in the generator.

G represents an oil-tank from which a continuous current of oil is supplied through the pipe H to the heaters.

$H'$ $H^2$ $H^3$ $H^4$ $H^5$ $H^6$ are heaters in which the current of oil is heated in gradually-increasing temperatures by being exposed to the heat of the hot products from the generator.

J $J'$ $J^2$ are condensers connected in series with the heaters.

L $L'$ $L^2$ are pipes for carrying the gaseous products from the condensers into the generating-chamber, and $L^3$ is a pipe for carrying the condensed products from the condenser $J^2$ into the regenerating-chamber.

In practice the parts being arranged substantially as described and shown they are intended to operate as follows: The generating-chamber is supplied with fuel, and by means of the air-blast active combustion is maintained in a portion of the fuel and the hot products therefrom are carried into the regenerating-chamber, where the heat is stored in the refractory material and in the brickwork surrounding the chamber. When the parts are thoroughly heated to a high temperature, steam, which is previously superheated by passing through the superheater described, is then introduced into the incandescent portion of the charge in the generator and the mixture of products is carried off into the regenerating-chamber and constitute the gas to be enriched by my improved method, which is intended to operate as follows: The current of oil from the tank passing into the rear end of the generator is gradually heated up to a temperature at which the most vaporizable constituent of the oil becomes heated to a temperature at which it is converted into fixed vapor. When being heated to this temperature, the hot products are carried into the first condenser J. In the drawing the current of oil is supposed to be heated to this temperature after passing through the first four heaters, and from there the pipe I carries the hot current into the condenser J, which is suitably supplied with a current of cold water, whereby all the vapors which are condensable are separable from the fixed vapors, which are led off through the pipe L, introduced into the regenerating-chamber. The liquid products from the condenser are carried through the pipe $I'$ into the next heater $H^5$, which is supposed to heat the current of oil to the temperature required to convert again the most vaporizable constituents now remaining into permanent vapors, and the hot products are carried through the pipe $I^2$ into the next condenser $J'$. Here again the fixed vapors are separated from the condensable products and carried through the pipe $L'$ into the regenerating-chamber, while the liquid products of condensation are carried through the pipe $I^3$ into the heater $H^6$, and in this the current of oil is again heated to a still higher temperature—that is, to the temperature required to convert the remaining vaporizable constituents of the oil into vapor, and the hot products are then carried to the pipe $I^4$, thereby separating the condensable vapors from the fixed vapors and introducing the latter through the pipe $L^2$ into the regenerating-chamber near its connection with the generating-chamber, or, if desired, into the charge of the generating-chamber itself. The fixed vapors which are thus introduced into the regenerating-chamber combine therein with the hot products to form a homogeneous gas, and preferably I introduce the fixed vapors from the different condensers separately at different points into the regenerating-chamber, according to the nature of the constituents from which the vapor has been obtained, it being well known that above a certain heat the vapors would be decomposed and converted into lampblack. The residuum, which is introduced through the pipe $L^3$, is subjected directly to the heated gases from the generator, and thus all the oil is converted into gaseous products without liability of converting a portion into lampblack or filling the pipes through which the gas is distributed with products of condensation of the aromatic oils of petroleum.

What I claim as my invention is—

1. In the manufacture of gas, the method of enriching gas obtained from other sources with petroleum oil, which consists in separately and continuously generating vapors from petroleum oil by heating a current of oil at increasing temperatures, separating from the heated current vapors generated from the oil at such temperatures at which the constituents of the oil are converted into fixed vapors, in separating the fixed vapors from the oil and condensable vapors by cooling and then combining the fixed vapors with the gas to be enriched at substantially the temperature at which such vapors became fixed, substantially as described.

2. In the manufacture of gas the method of enriching the hot gases from the generator with petroleum oil, which consists in continuously generating from petroleum the fixed vapors of the constituents of the oil by subjecting a current of oil to vaporization in a series of heaters at increasing temperatures, corresponding to the temperatures at which the constituents of the oil are successively converted into fixed vapors, in separating the fixed vapors of such constituents from the oil and other vapors and then introducing and combining such fixed vapors separately with the hot gases at specified temperatures approximating respectively the same as that at which such vapors become fixed, substantially as described.

3. In the manufacture of gas, the method of enriching the hot gases from a generator with the fuel oil, which consists in conducting the hot gases from the generator through a conduit in contact with refractory material, in passing a current of oil through a series of heaters in suitable contact with the hot gases from the generator to heat the oil successively in the heaters to the temperatures at which the constituents of the oil are separately converted into fixed vapors, in separating the fixed vapors generated in each heater from the oil and other vapors, and in introducing such fixed vapors into the conduit in contact with the hot gases respectively where the temperature is approximately that at which such vapors became fixed, substantially as described.

4. In the manufacture of gas, the method of enriching the hot gases from the generator, which consists in conducting the same through a conduit in contact with refractory material and thereby storing the heat, in passing a current of oil in opposite directions to the flow of the hot gases through a series of heaters and heating it with the stored heat successively in the different heaters to the temperatures at which the constituents of the oil are converted into permanent vapors in cooling the vapors from each heater and carrying the products of condensation into the next heater and in introducing the remaining vapors into the heated conduit and combining them with the hot gases at points where the temperatures are substantially that at which such vapors became fixed, substantially as described.

5. The continuous process of manufacturing gas, which consists in blasting bituminous coal to incandescence, introducing air and superheated steam, storing the heat of the hot products in a regenerating chamber containing refractory materials, in subjecting a current of petroleum oil alternately to the heat of the hot products at temperatures at which the constituents of the oil are separately converted into fixed vapors and to cooling in a condenser, and in introducing the fixed vapors obtained after each cooling into the hot products at approximately the temperature at which the vapors became fixed, substantially as described.

6. The continuous process of manufacturing gas which consists in blasting coal in a single generating chamber and storing the heat of the hot products in a regenerating chamber containing refractory material in subjecting a current of steam and one of petroleum oil to the heat of the hot products at gradually increasing temperatures and thereby superheating steam and generating vapors of petroleum, in introducing the superheated steam into the generator and decomposing it in contact with the fuel, in separating from the petroleum oil the fixed vapors generated at a temperature at which the constituents of the oil are successively converted into fixed vapors, in introducing said vapors into the regenerating chamber and combining them with the products from the generator at temperatures substantially that by which the vapors became fixed and in subjecting the residuum of the oil directly to the action of the hot products from the generator, substantially as described.

In testimony whereof I affix my signature in presence of two witnesses.

EZRA S. HOYT.

Witnesses:
 M. B. O'DOGHERTY,
 L. J. WHITTEMORE.